(12) United States Patent
Lin

(10) Patent No.: US 12,291,305 B2
(45) Date of Patent: May 6, 2025

(54) WIRE CONTROL DEVICE FOR BICYCLE HANDLEBAR

(71) Applicant: J.D COMPONENTS CO., LTD., Chang Hua Hsien (TW)

(72) Inventor: Yu-An Lin, Chang Hua Hsien (TW)

(73) Assignee: J.D COMPONENTS CO., LTD., Chang Hua Hsien (TW)

( * ) Notice: Subject to any disclaimer, the term of this patent is extended or adjusted under 35 U.S.C. 154(b) by 179 days.

(21) Appl. No.: 18/152,555

(22) Filed: Jan. 10, 2023

(65) Prior Publication Data

US 2023/0219654 A1 Jul. 13, 2023

(30) Foreign Application Priority Data

Jan. 10, 2022 (TW) .................................. 111200311

(51) Int. Cl.
*B62M 25/04* (2006.01)
*B62K 21/12* (2006.01)

(52) U.S. Cl.
CPC ............. *B62M 25/04* (2013.01); *B62K 21/12* (2013.01)

(58) Field of Classification Search
CPC ......... B62M 25/04; B62M 9/12; B62K 21/12; B62K 23/06
See application file for complete search history.

(56) References Cited

U.S. PATENT DOCUMENTS

| 5,287,765 | A  | * | 2/1994  | Scura ..................... | B62K 23/06 |
|           |    |   |         |                            | 74/489     |
| 10,473,143 | B2 |   | 11/2019 | Basiliere                 |            |
| 10,994,799 | B1 | * | 5/2021  | Zaehnle ................... | G05G 1/04 |
| 2021/0245831 | A1 | * | 8/2021  | Anspach ................ | B62K 23/06 |
| 2022/0212748 | A1 | * | 7/2022  | Kerson .................. | B62K 23/06 |
| 2022/0242510 | A1 | * | 8/2022  | Pfeiffer ................. | B62K 23/06 |
| 2023/0118027 | A1 | * | 4/2023  | Chuang .................. | B62K 19/30 |
|           |    |   |         |                            | 74/501.6   |
| 2023/0182853 | A1 | * | 6/2023  | Staples .................. | F16C 1/262 |
|           |    |   |         |                            | 74/501.6   |

OTHER PUBLICATIONS

How to measure the strength of a mechanical structure? Microsoft Bing, Aug. 29, 2024 (Year: 2024).*

* cited by examiner

*Primary Examiner* — Vinh Luong
(74) *Attorney, Agent, or Firm* — Muncy, Geissler, Olds & Lowe, P.C.

(57) ABSTRACT

A wire control device, which is disposed on a handlebar of a bicycle, includes a main body, a bearing and a handle assembly. The main body includes a bearing fixing seat having an annular inner wall. The bearing is disposed in the bearing fixing seat and includes inner and outer races. The outer race of the bearing is in contact with the annular inner wall of the bearing fixing seat. The handle assembly is rotatably disposed on the main body and has a rotary axle. The inner race of the bearing is sleeved onto and in contact with the rotary axle.

18 Claims, 15 Drawing Sheets

WIRE CONTROL DEVICE FOR BICYCLE HANDLEBAR

BACKGROUND OF THE INVENTION

1. Field of the Invention

The present invention relates to a wire control device for a bicycle and more particularly, to a wire control device having high structural strength.

2. Description of the Related Art

Referring to U.S. patent Ser. No. 10/473,143, it disclosed a traditional wire control device. Referring to FIG. 2 of the aforementioned patent, a wire control device 10 described in the aforementioned patent structurally includes a base 20, an actuation lever 30 and a bearing 40. The bearing 40 is installed in a hole 32 of a body portion 31 of the actuation lever 30, and an outer race 42 of the bearing 40 is in contact with an inner diameter surface 33 of the body portion 31. An inner race 41 of the bearing 40 is in contact with an outer diameter surface 51 of an axle 50, and the axle 50 is supported by the base 20. By the above-described configuration design of the wire control device 10, the bearing 40 is helpful for enabling the actuation lever 30 to rotate smoothly to pull a control cable 12 (shown in FIG. 5 and FIG. 6 of the aforementioned patent) to drive a derailleur or a seat post elevating device of a bicycle.

However, in the aforementioned patent, the bearing 40 is embedded in the actuation lever 30, resulting in that the actuation lever 30 is obviously larger in volume than the base 20, thereby causing the low integrative structural strength problem to the wire control device 10. That means during the actuation lever 30 is pulled, the stress applied to the base 20 by the actuation lever 30 may be so large as to cause the structural damage problem. It can be seen that the configuration design of the presently available wire control device is not good enough and thereby needs improvement.

SUMMARY OF THE INVENTION

It is one of the objectives of the present invention to provide a wire control device, which has relatively higher structural strength.

Accordingly, the present invention provides a wire control device having high structural strength, which is disposed on a handlebar of a bicycle. The wire control device includes a main body, a bearing and a handle assembly. The aforementioned main body includes a bearing fixing seat, and the bearing fixing seat has an annular inner wall. The aforementioned bearing is disposed in the bearing fixing seat and includes an inner race and an outer race. The outer race of the bearing is in contact with the annular inner wall of the bearing fixing seat. The aforementioned handle assembly is rotatably disposed on the aforementioned main body. The handle assembly has a rotary axle. The inner race of the bearing is sleeved onto and in contact with the rotary axle.

By the above-described configuration design of the wire control device, the bearing is primarily installed on the bearing fixing seat of the main body, the outer race of the bearing is in contact with the annular inner wall of the bearing fixing seat, and the inner race is in contact with the rotary axle of the handle assembly. Therefore, the whole handle assembly of the wire control device is unnecessarily configured with quite large volume, as long as it can be rotatably disposed on the main body and can be inserted into the inner race of the bearing through the rotary axle. The main body will not be applied with too large stress by the handle assembly, so the wire control device of the present invention has relatively higher structural strength.

In one of the aspects, the wire control device of the present invention is installed on a horizontal handlebar, but it may be applied to a curved handlebar.

BRIEF DESCRIPTION OF THE DRAWINGS

The detailed structure, features, assembly or usage of the wire control device will be described in the following embodiments. However, it should be understandable that the embodiments to be described herein below and the figures are given by way of illustration only, not intended to limit the scope of the claims of the present invention, and wherein:

FIG. 1 and FIG. 2 are perspective views of a wire control device of a first embodiment of the present invention, wherein FIG. 1 illustrates the situation that the wire control device is applied to a horizontal handlebar;

DETAILED DESCRIPTION OF THE INVENTION

Figure 1:
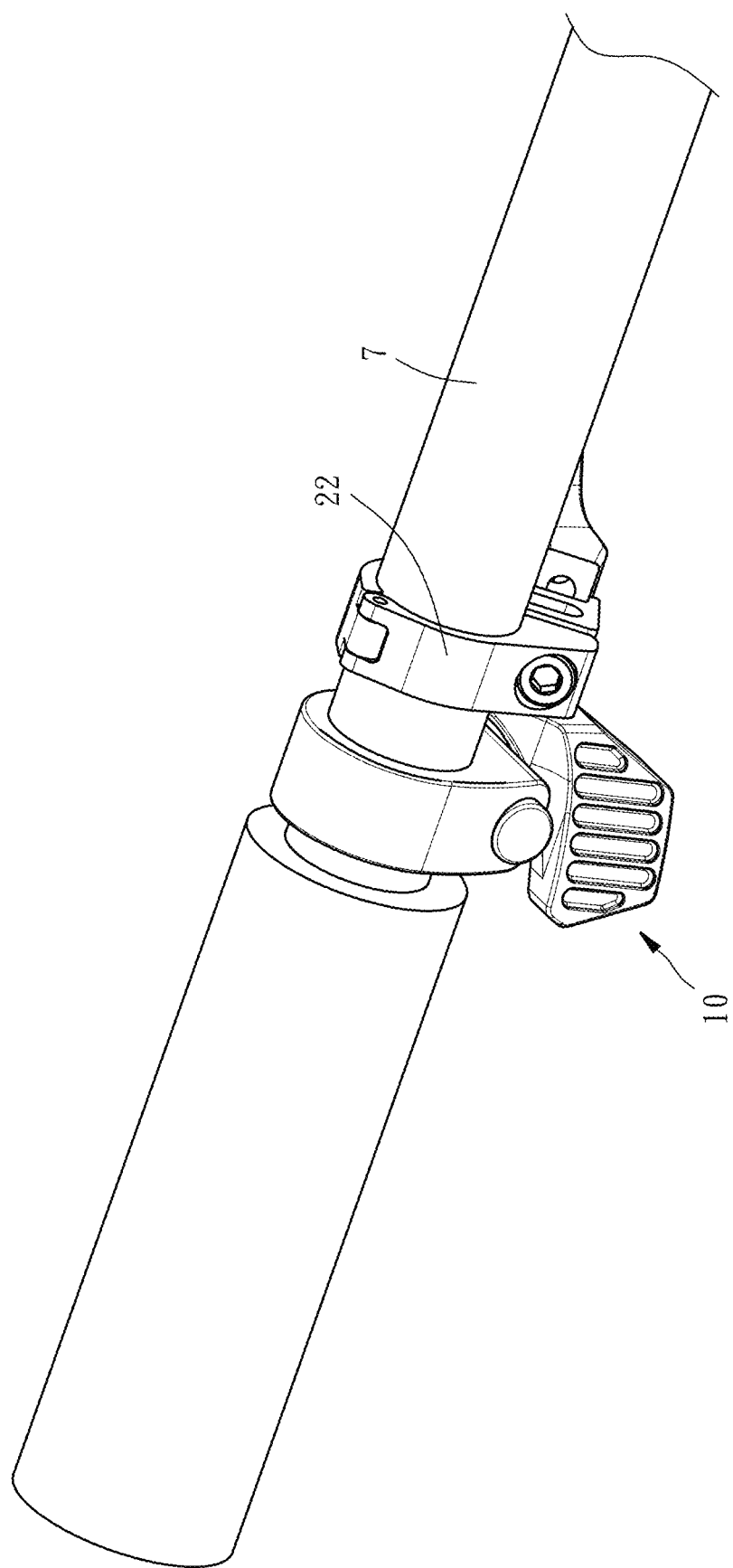

First of all, it is to be mentioned that the technical features provided by the present invention are unlimited to the specific structure, usage and application thereof described in the detailed description of the invention. It should be understood by those skilled in the related art that all the terms used in the contents of the specification are for illustrative description. The directional terms mentioned in the contents of the specification, such as 'front', 'upper', 'lower', 'rear', 'left', 'right', 'top', 'bottom', 'in', and 'out', are also just for illustrative description on the basis of normal usage direction, not intended to limit the claimed scope.

For the detailed description of the technical features of the present invention, three embodiments are instanced herein below and illustrated in coordination with the figures.

As shown in FIG. 1 to FIG. 6, a first embodiment illustrates a wire control device 10, which is installed on a handlebar 7 of a bicycle (the handlebar 7 in this embodiment is a horizontal handlebar) for actuating a derailleur or a seat post elevating device or other similar devices of the bicycle through a control cable (not shown). The wire control device 10 structurally includes a main body 20, a bearing 30 and a handle assembly 40.

Figure 2:
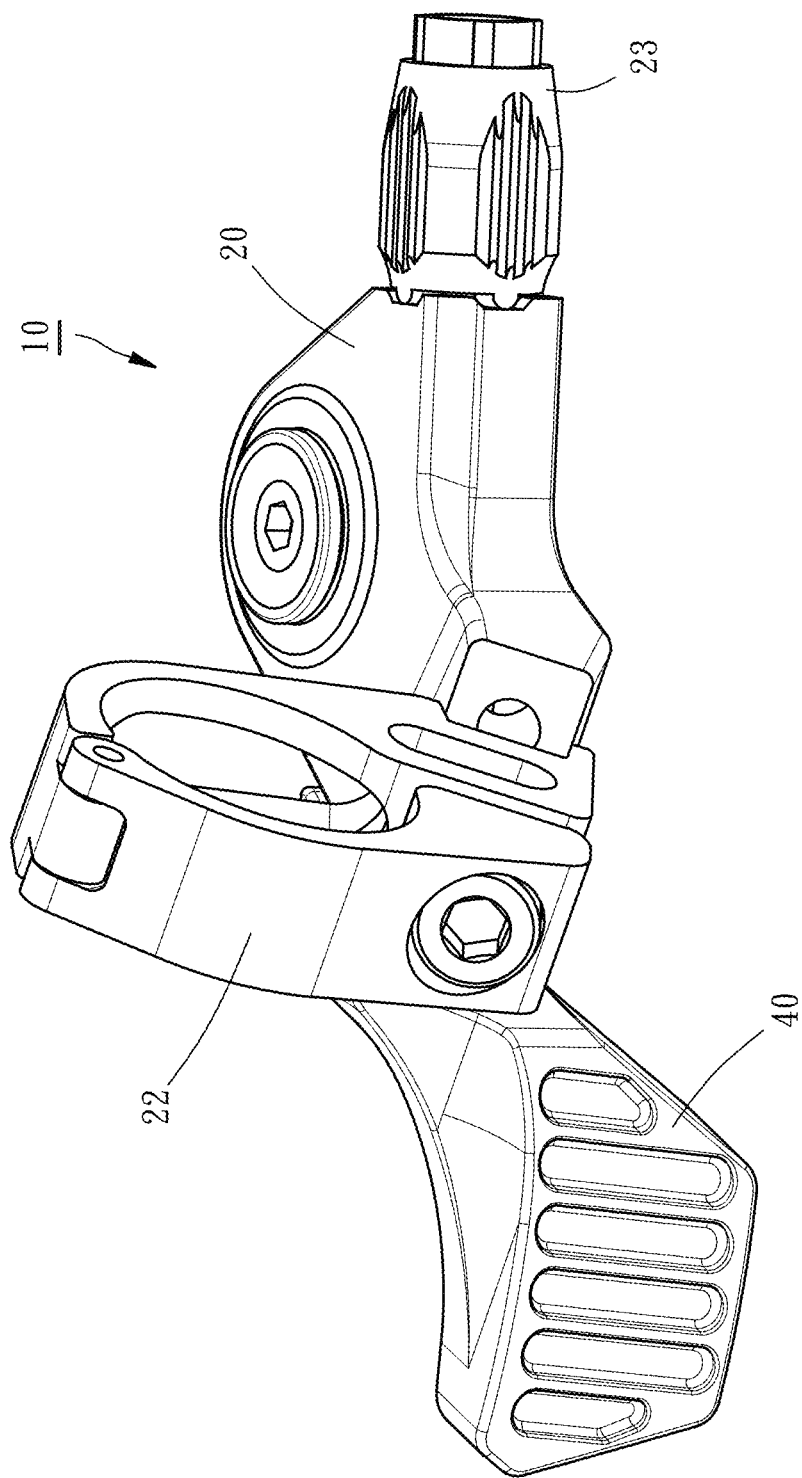
Figure 3:
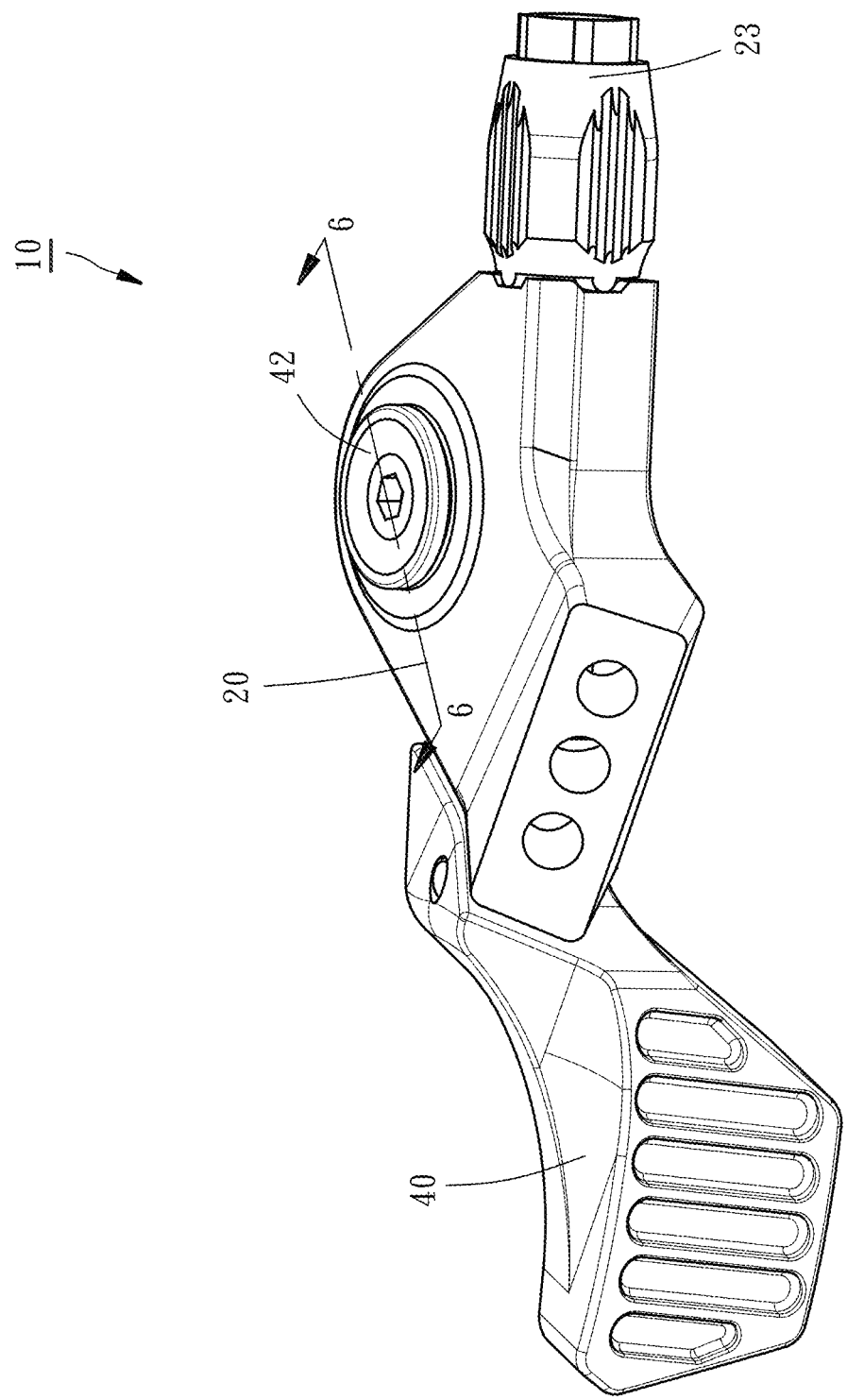
FIG. 3 is a perspective view of the wire control device of the first embodiment, wherein a clamping annular sleeve of the wire control device is omitted.
Figure 5:
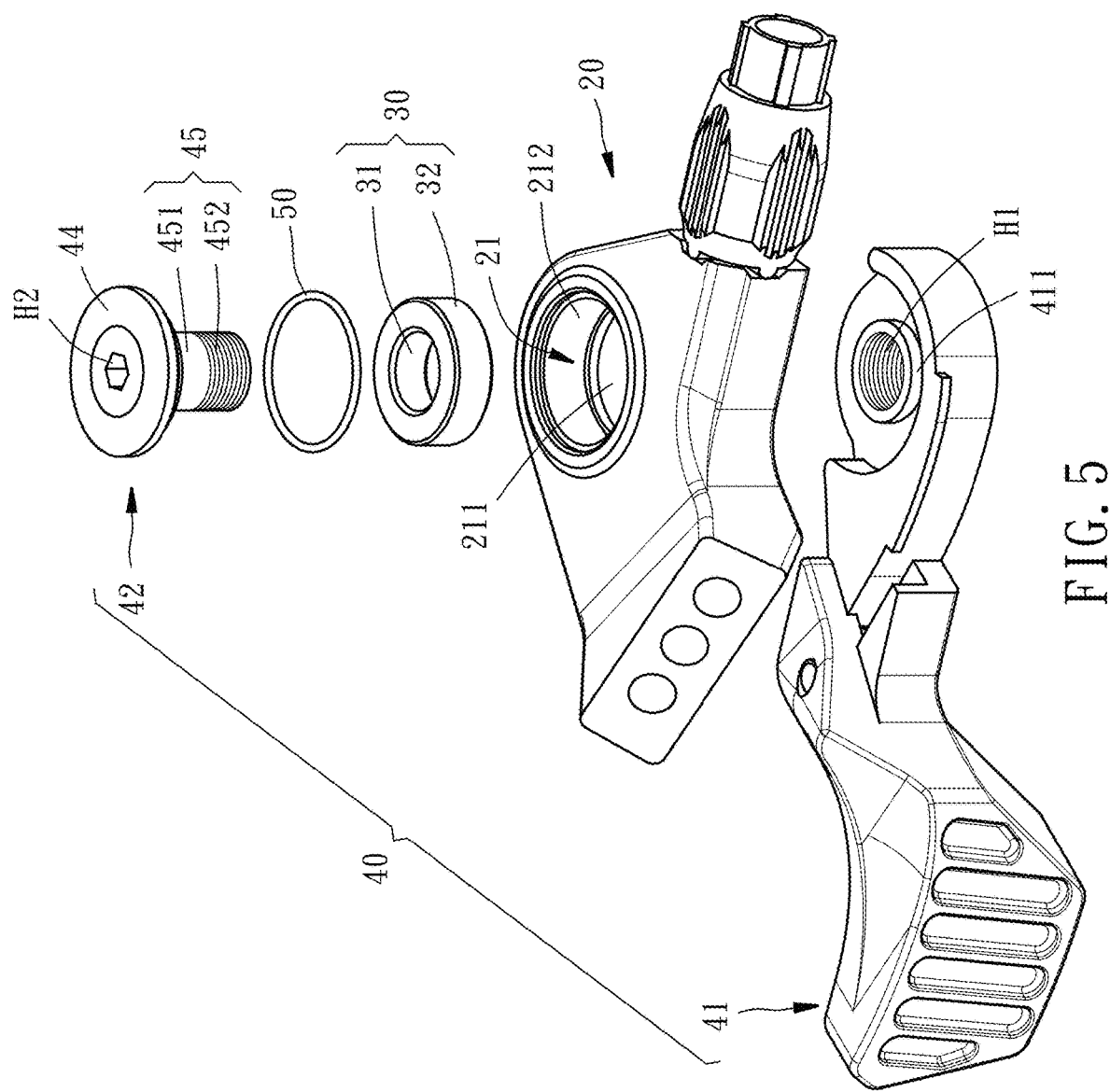
FIG. 5 is an exploded view of FIG. 3.

As shown in FIG. 2 and FIG. 5, the main body 20 structurally includes a bearing fixing seat 21, a clamping annular sleeve 22 and a stress regulator 23. The bearing fixing seat 21 has a hole 211 and an annular inner wall 212. The hole 211 penetrates through upper and lower sides of the main body 20. The wire control device 10 is fixed to the handlebar 7 of the bicycle through the clamping annular sleeve 22. The stress regulator 23 is adapted for adjusting the tensioned extent of the control cable.

The bearing 30 is embedded in the bearing fixing seat 21 and structurally includes an inner race 31 and an outer race 32. The outer race 32 of the bearing 30 is in contact with the annular inner wall 212 of the bearing fixing seat 21.

The handle assembly 40 is rotatably disposed on the main body 20. The handle assembly 40 structurally includes a shift lever 41 and a pivot screw 42. The shift lever 41 has a cylinder-shaped protrusion 411. The protrusion 411 has a threaded hole H1. The annular inner wall 212 of the bearing fixing seat 21, the bearing 30 and the threaded hole H1 are arranged coaxially. The protrusion 411 is abutted against a bottom rim of the inner race 31 of the bearing 30. The pivot screw 42 includes a head portion 44 and a rotary axle 45. The head portion 44 is provided on the top side thereof with an inner hexagonal hole H2, enabling the rider to use a hexagonal wrench to rotate the pivot screw 42. The head portion 44 is provided on the bottom side thereof with an annular flange 441 (shown in FIG. 6). The annular flange 441 is abutted against a top rim of the inner race 31. The rotary axle 45 includes an unthreaded section 451 and a threaded section 452. The unthreaded section 451 is located between the head portion 44 and the threaded section 452. The inner race 31 of the bearing 30 is sleeved onto and in contact with the unthreaded section 451 of the rotary axle 45. The threaded section 452 is screwed into the threaded hole H1 of the protrusion 411 of the shift lever 41.

Figure 4:
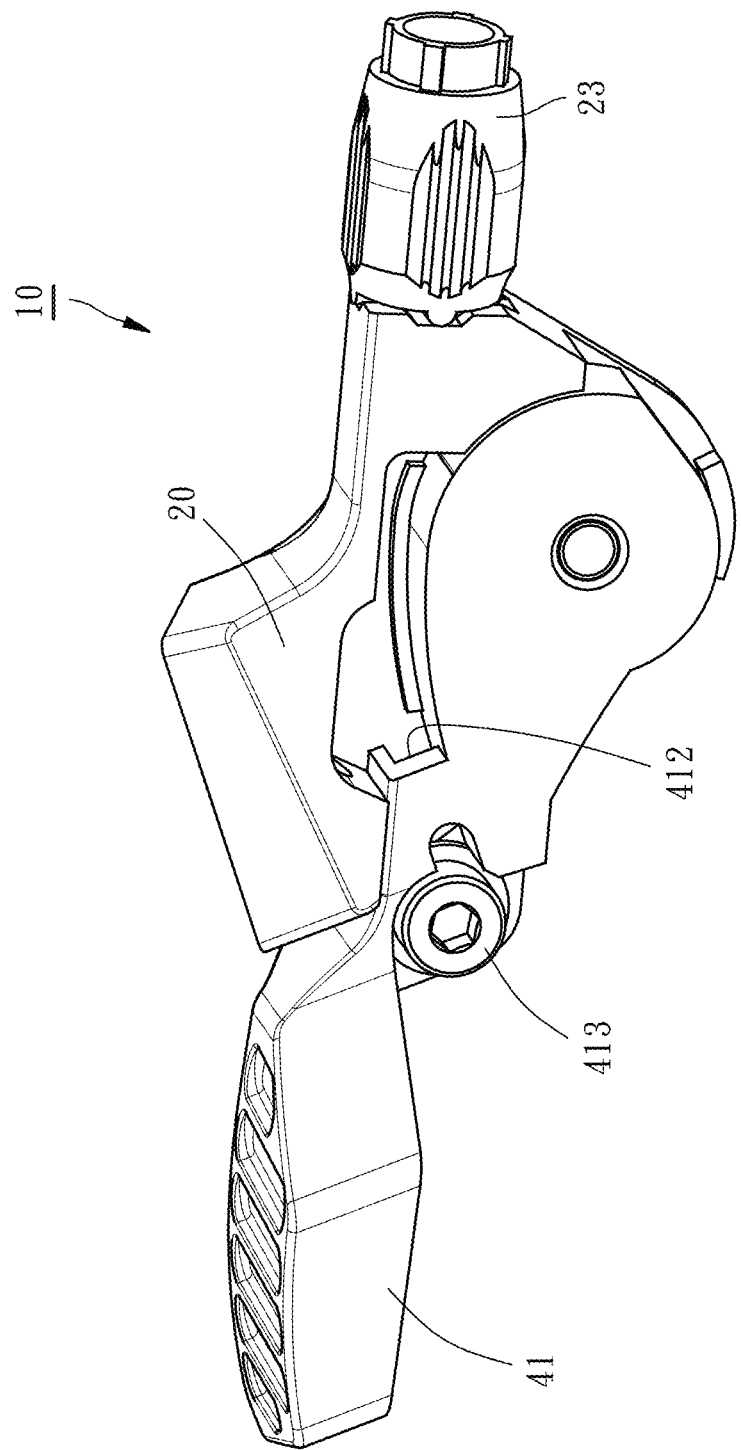
FIG. 4 is a perspective view from another direction of FIG. 3.

Referring to FIG. 4, the shift lever 41 further has a control cable inserting hole 412 and a fastening screw 413, so that the control cable extending out from the stress regulator 23 can be inserted through the control cable inserting hole 412. The control cable is fastened to the shift lever 41 by the fastening screw 413, so that when the shift lever 41 is pressed to rotate, it can pull the control cable to drive the derailleur or seat post elevating device.

Figure 6:
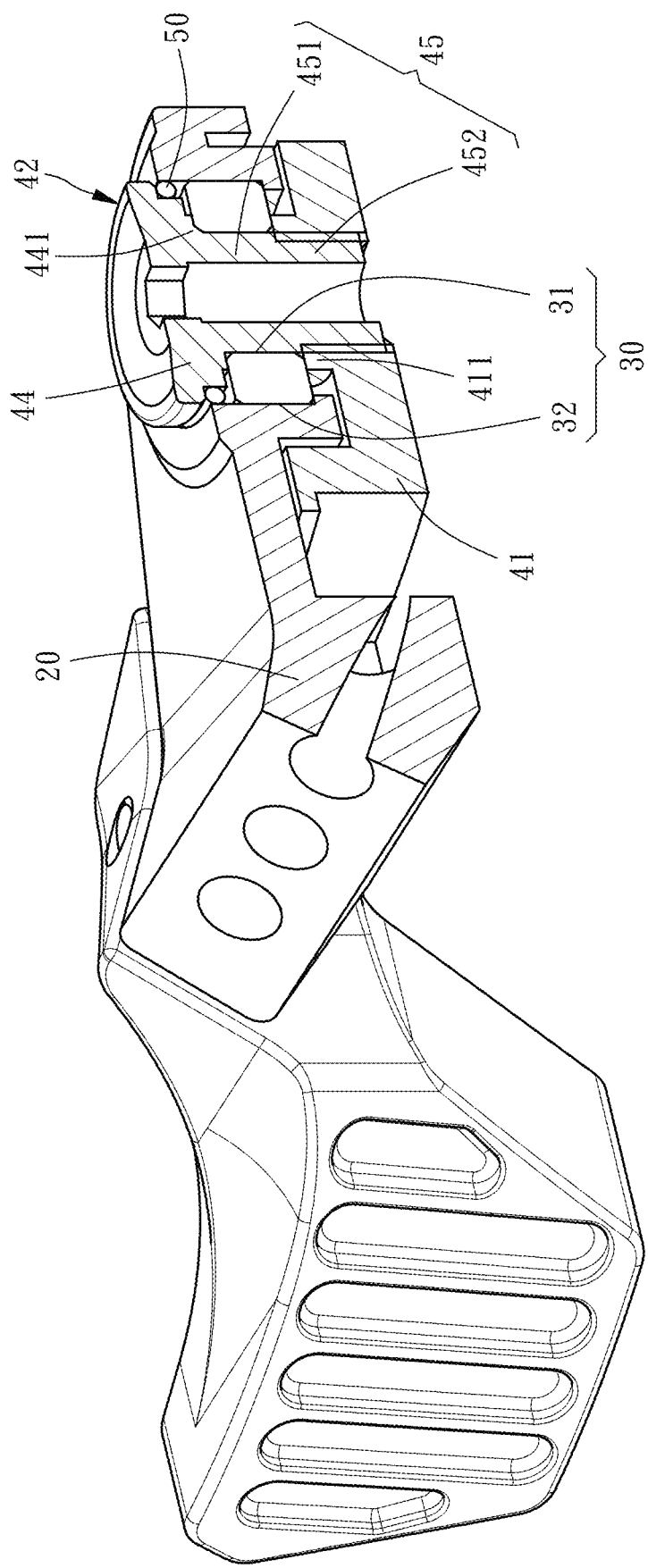
FIG. 6 is a cut-off view taken along line 6-6 of FIG. 3.

Besides, for enhancing the waterproof effect, the wire control device 10 further includes an O-ring 50 (shown in FIG. 5 and FIG. 6). The O-ring 50 is abutted between the head portion 44 of the pivot screw 42 and a top end rim of the bearing fixing seat 21. The bearing 30 is located between the top end rim of the bearing fixing seat 21 and the shift lever 41.

By the configuration design of the wire control device 10 of the first embodiment, the bearing 30 is primarily installed on the bearing fixing seat 21 of the main body 20, the outer race 32 of the bearing 30 is directly in contact with the annular inner wall 212 of the bearing fixing seat 21, and the inner race 31 is directly in contact with the unthreaded section 451 of the pivot screw 42. Therefore, the whole shift lever 41 of the handle assembly 40 of the wire control device 10 is unnecessarily configured with quite large volume, as long as the handle assembly 40 can be rotatably disposed on the main body 20 and can be inserted into the inner race 31 of the bearing 30 through the unthreaded section 451. The handle assembly 40 is relatively smaller in its own volume and the stress applied thereby to the main body 20 will not be too large, so the wire control device 10 of this embodiment has relatively higher structural strength.

Figure 7:
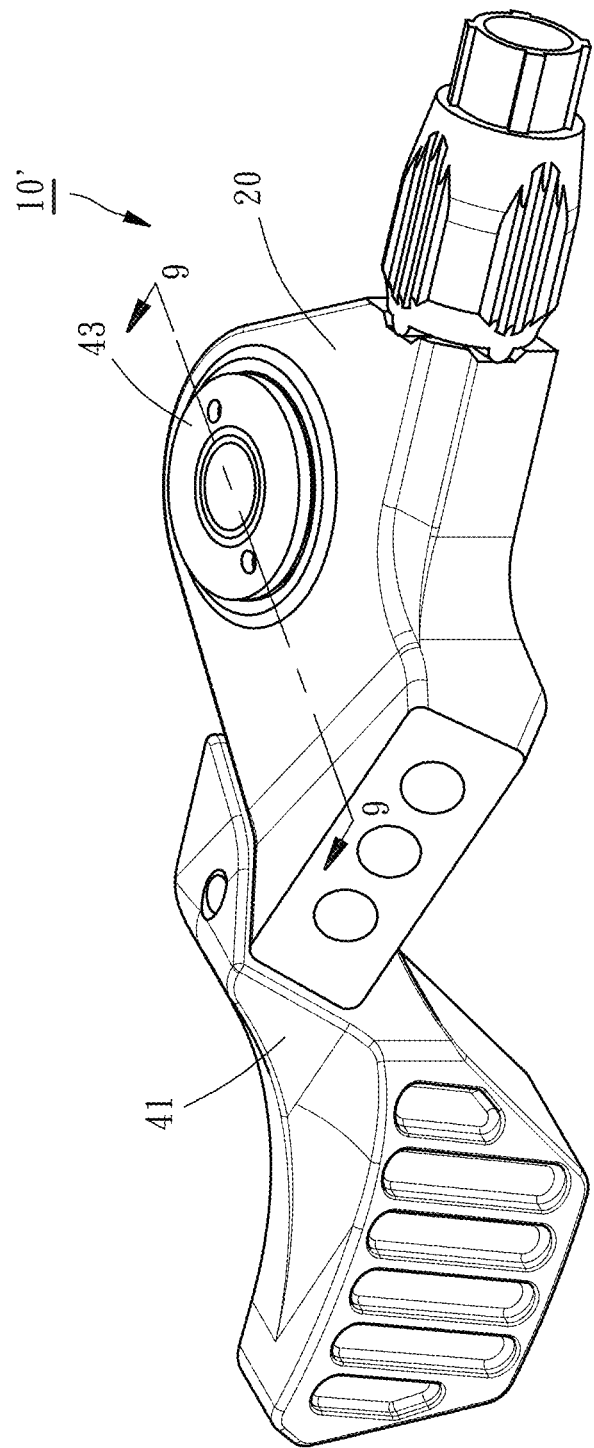
FIG. 7 is a perspective view of a wire control device of a second embodiment of the present invention, wherein a clamping annular sleeve is omitted.
Figure 8:
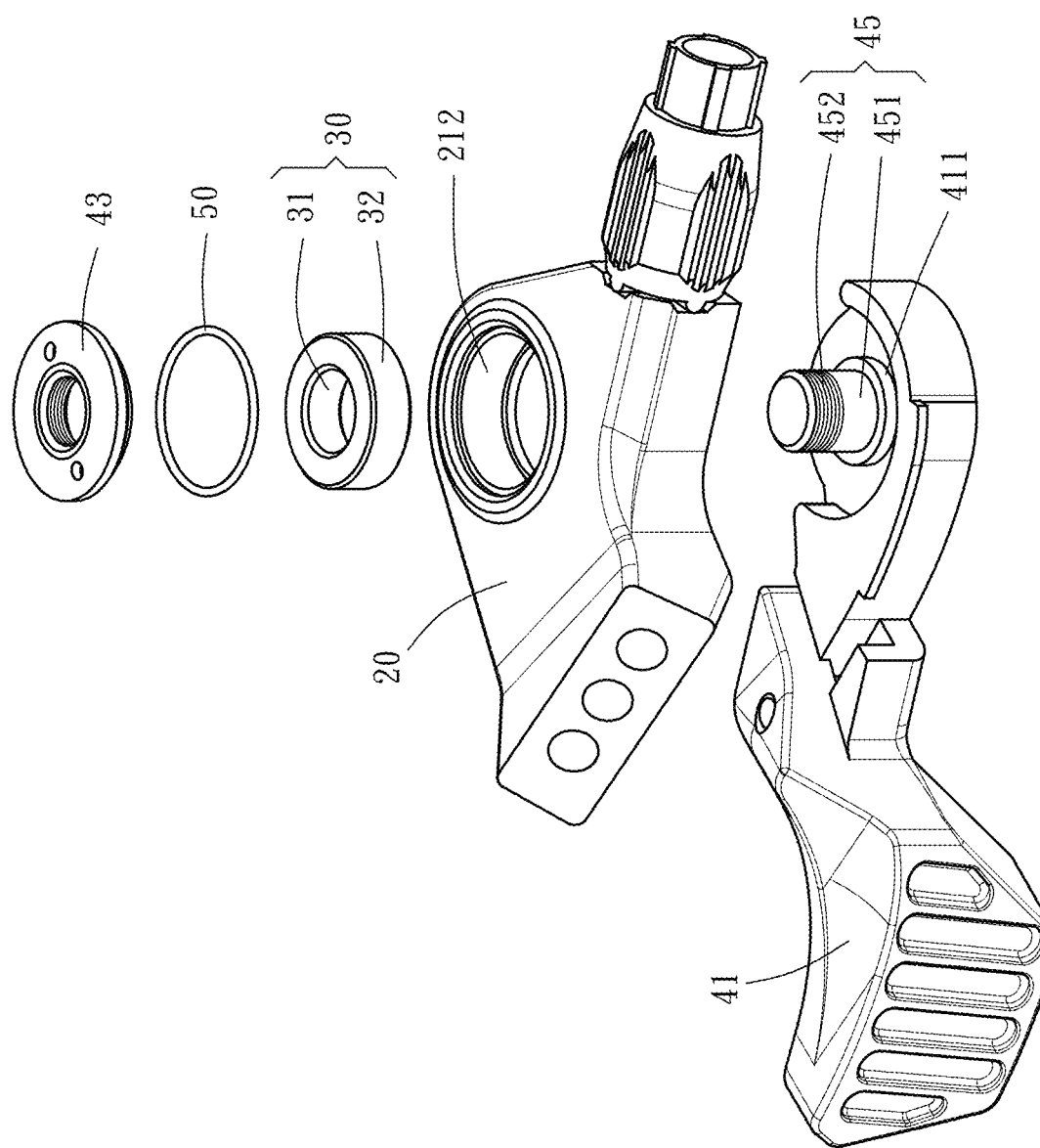
FIG. 8 is an exploded view of FIG. 7.
Figure 9:
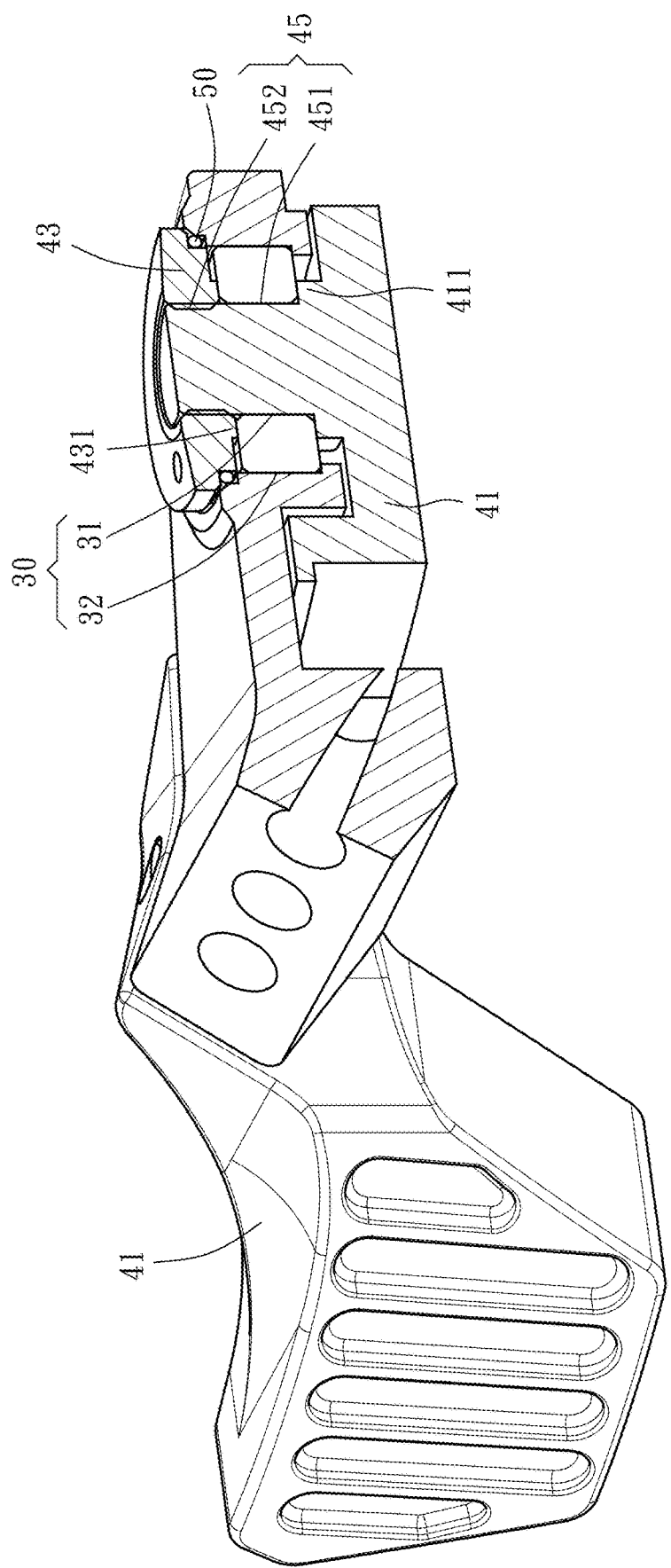
FIG. 9 is a cut-off view taken along line 9-9 of FIG. 7.

The present invention further provides a second embodiment. Referring to FIG. 7 to FIG. 9, a wire control device 10' of the second embodiment is similar in structure to the first embodiment, but one of the differences therebetween is that the handle assembly 40 in the second embodiment further includes a nut 43. The rotary axle 45 is connected to the protrusion 411 of the shift lever 41. The outer radius of the protrusion 411 is larger than the outer radius of the rotary axle 45. The rotary axle 45 has an unthreaded section 451 and a threaded section 452. The unthreaded section 451 is located between the threaded section 452 and the protrusion 411 of the shift lever 41. The inner race 31 of the bearing 30 is sleeved onto and in contact with the unthreaded section 451 of the rotary axle 45, and the nut 43 is screwed onto the threaded section 452. Besides, the nut 43 has an annular flange 431 (shown in FIG. 9). The annular flange 431 of the nut 43 is abutted against the top rim of the inner race 31 of the bearing 30.

In addition, the wire control device 10' of the second embodiment also has an O-ring 50. The O-ring 50 is abutted between the nut 43 and the top end rim of the bearing fixing seat 21. The bearing 30 is located between the top end rim of the bearing fixing seat 21 and the shift lever 41. The configuration design of the wire control device 10' of the second embodiment is also effective in enhancing the structural strength of the whole wire control device 10'.

Figure 10:
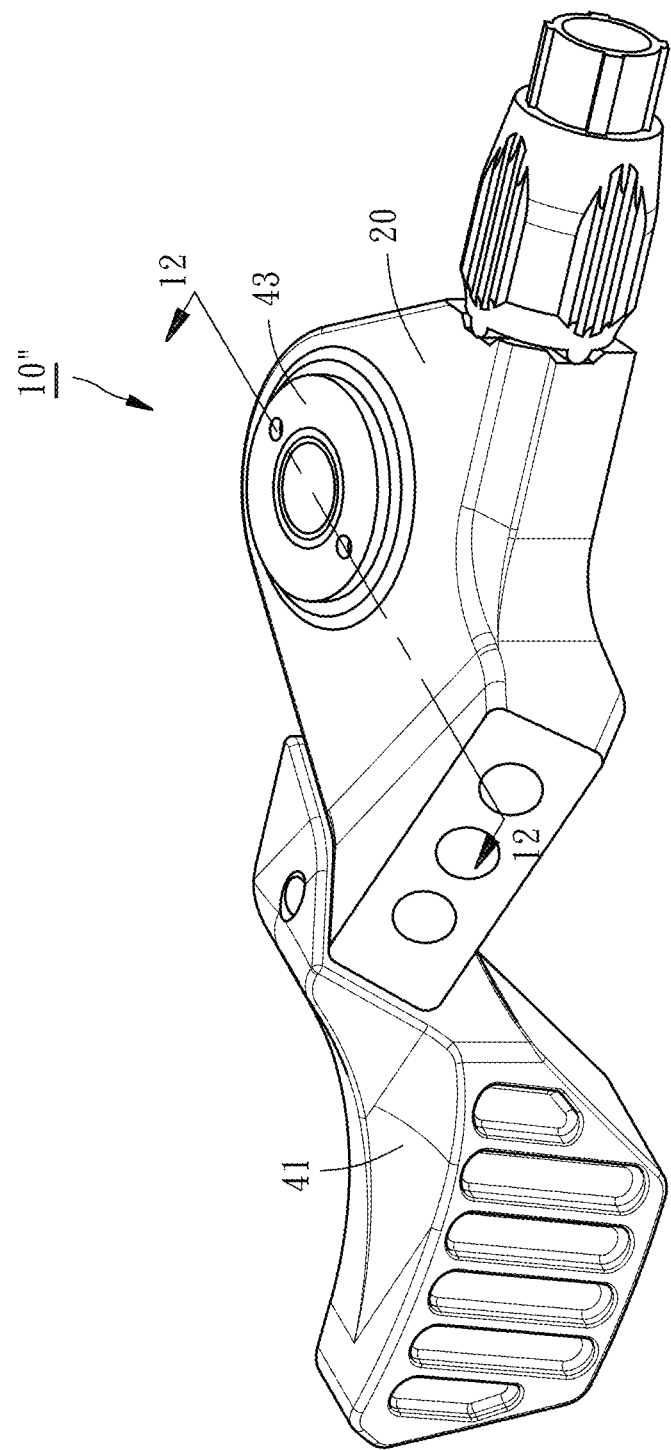
FIG. 10 is a perspective view of a wire control device of a third embodiment of the present invention, wherein a clamping annular sleeve is omitted.
Figure 11:
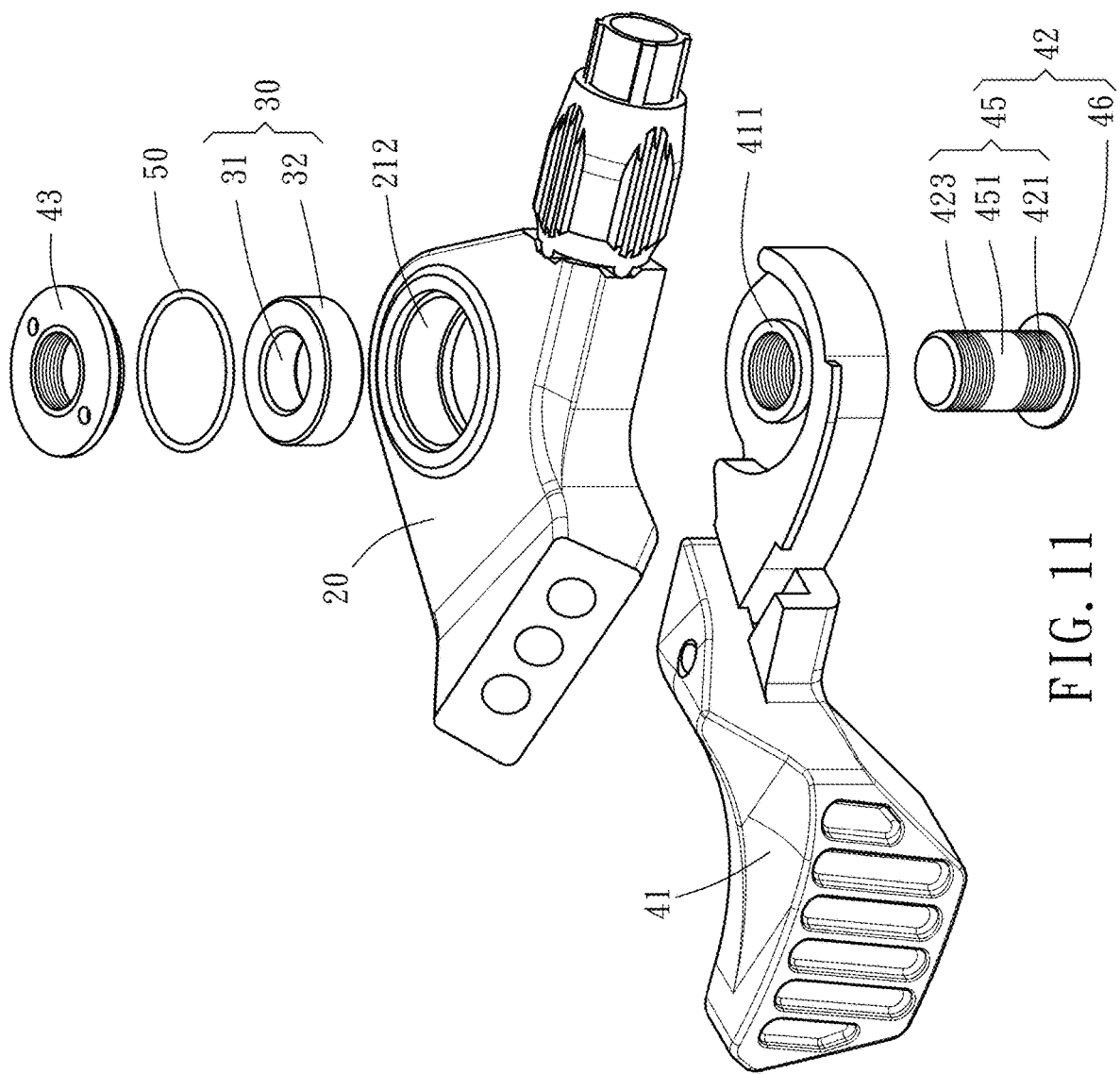
FIG. 11 is an exploded view of FIG. 10.
Figure 12:
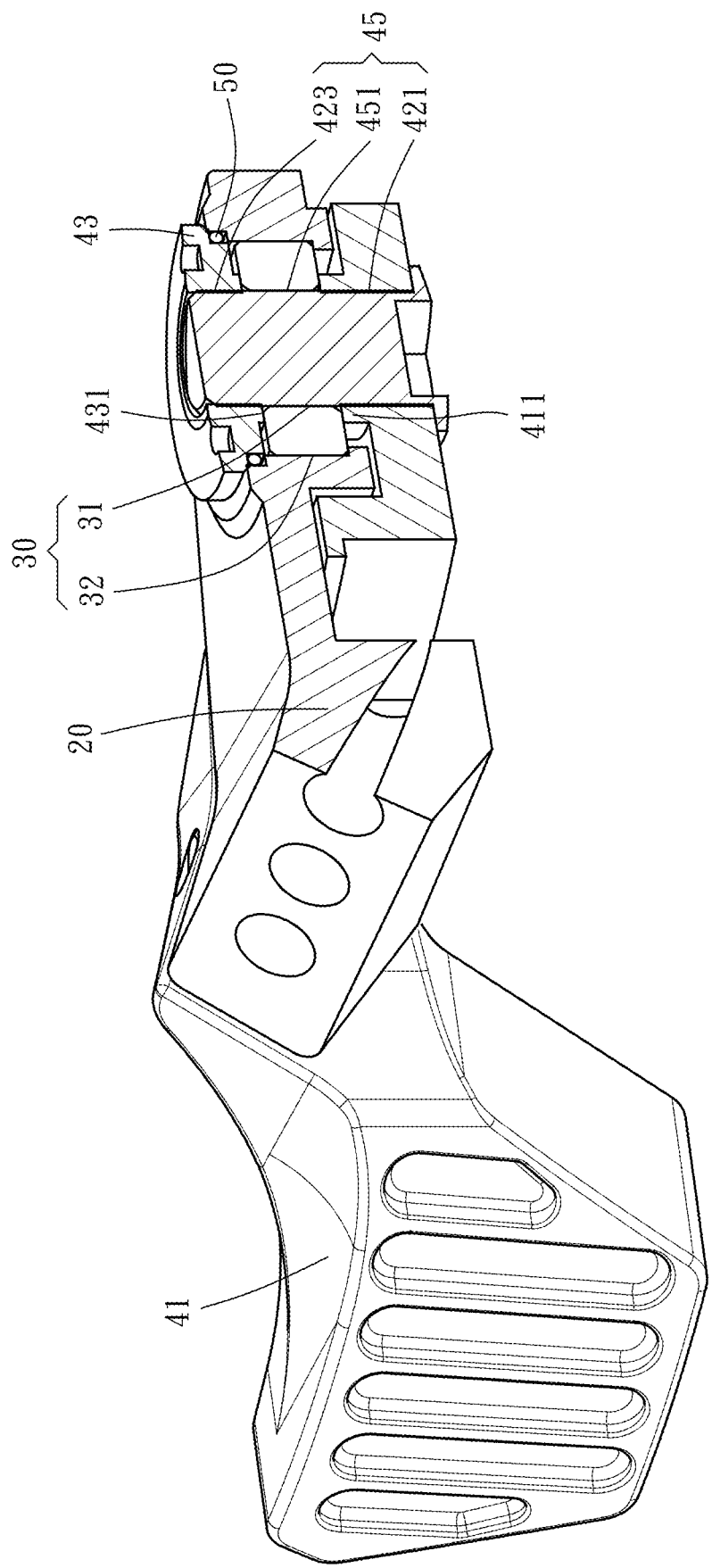
FIG. 12 is a cut-off view taken along line 12-12 of FIG. 10.

The present invention further provides a third embodiment. Referring to FIG. 10 to FIG. 12, a wire control device 10" of the third embodiment is similar in structure to the first embodiment. The handle assembly 40 of the third embodiment structurally includes a shift lever 41, a pivot screw 42 and a nut 43. The protrusion 411 of the shift lever 41 has a threaded hole H1. The pivot screw 42 structurally includes a head portion 46 and a rotary axle 45. The rotary axle 45 has a first threaded section 421, an unthreaded section 451 and a second threaded section 423. The unthreaded section 451 is located between the first threaded section 421 and the second threaded section 423. The first threaded section 421 of the pivot screw 42 is connected to the head portion 46 and screwed into the threaded hole H1 of the protrusion 411 of the shift lever 41. The inner race 31 of the bearing 30 is sleeved onto and directly in contact with the unthreaded section 451, and the nut 43 is screwed onto the second threaded section 423.

Likewise, the nut 43 in the third embodiment also has an annular flange 431 (shown in FIG. 12). The annular flange 431 of the nut 43 and the protrusion 411 of the shift lever 41 are abutted against the top side and bottom side of the inner race 31 of the bearing 30 respectively. Besides, the wire control device 10" also has an O-ring 50. The O-ring 50 is abutted between the nut 43 and the top end rim of the bearing fixing seat 21, and the bearing 30 is located between the top end rim of the bearing fixing seat 21 and the protrusion 411 of the shift lever 41.

Figure 13:
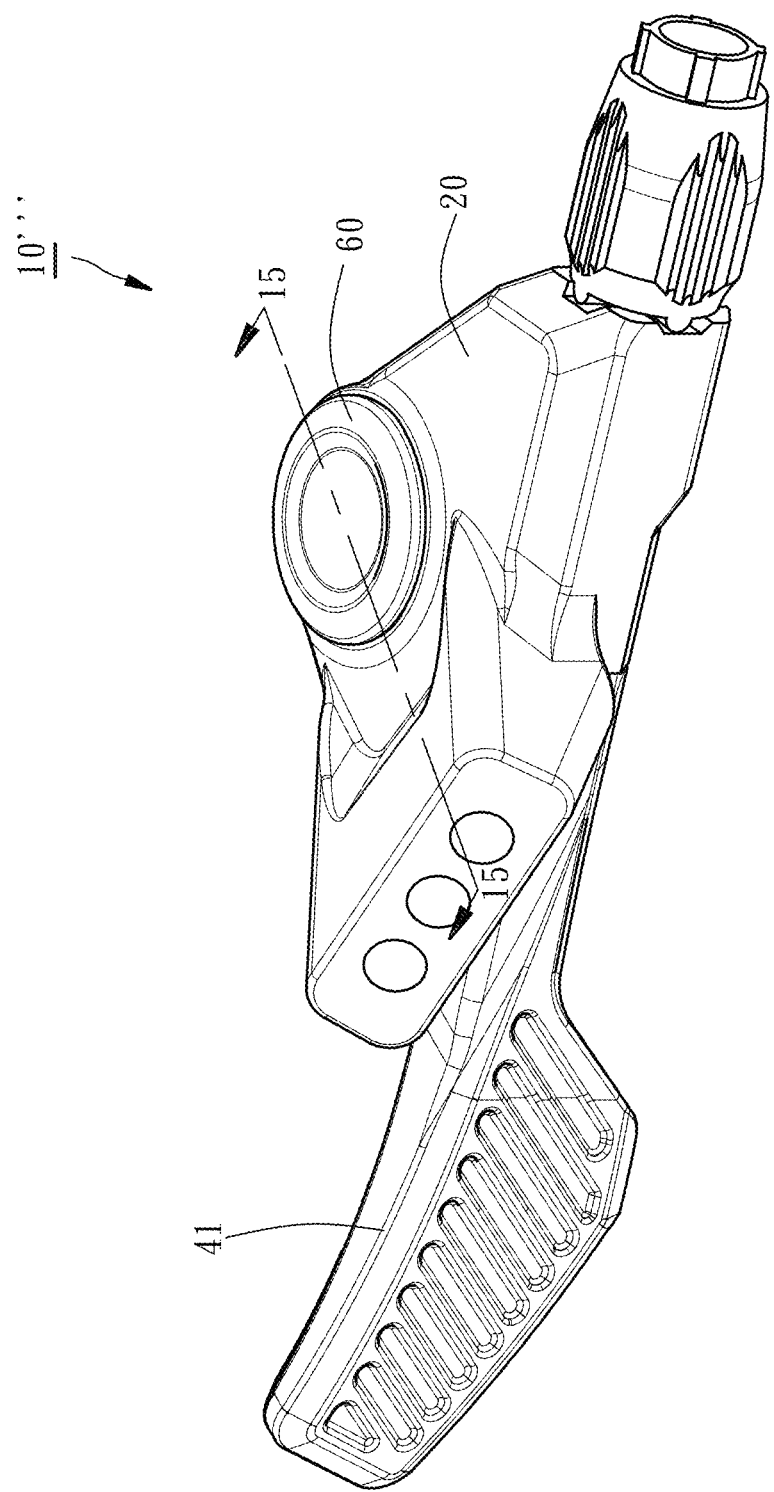
FIG. 13 is a perspective view of a wire control device of a fourth embodiment of the present invention, wherein a clamping annular sleeve is omitted.
Figure 14:
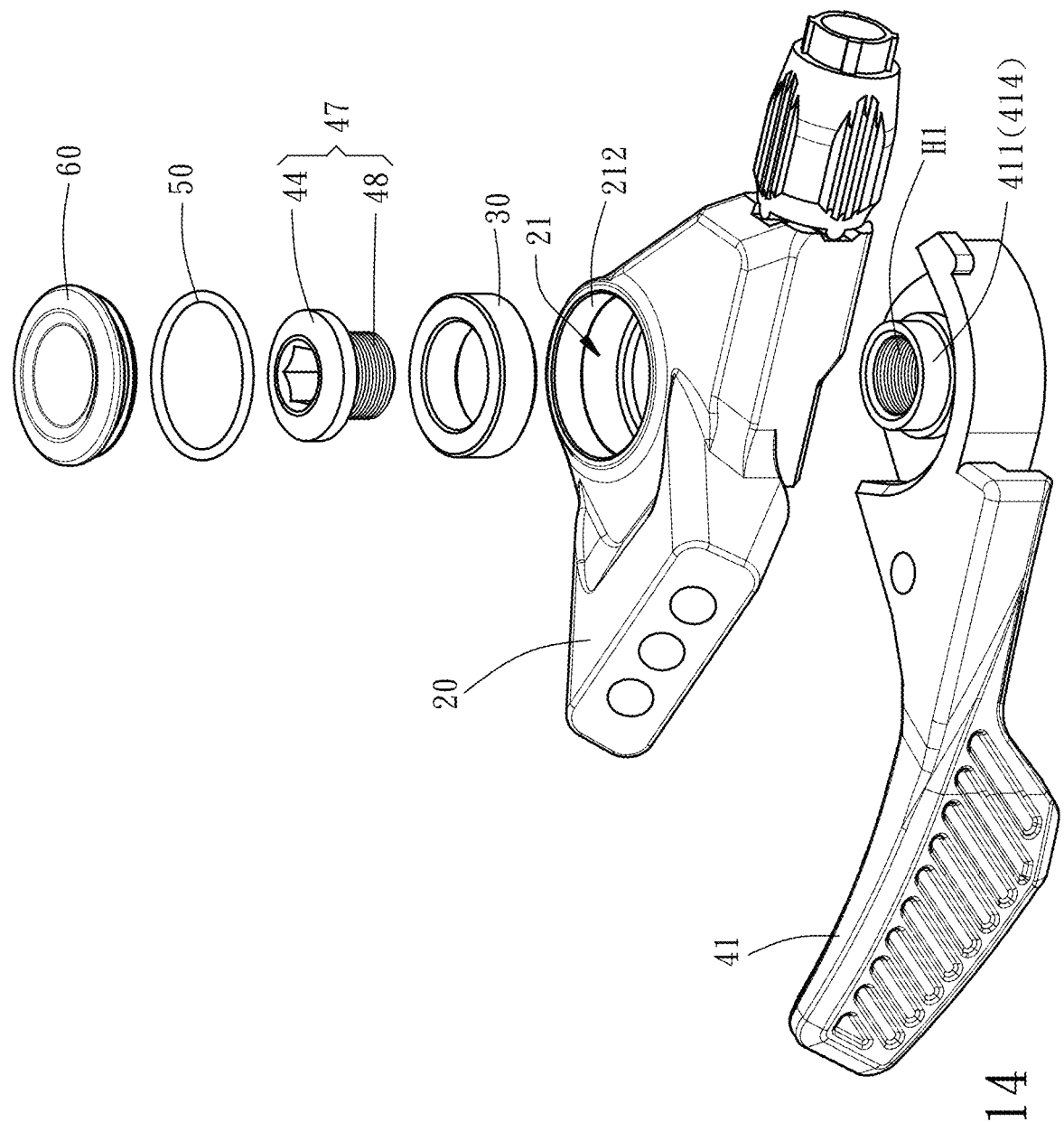
FIG. 14 is an exploded view of FIG. 13.
Figure 15:
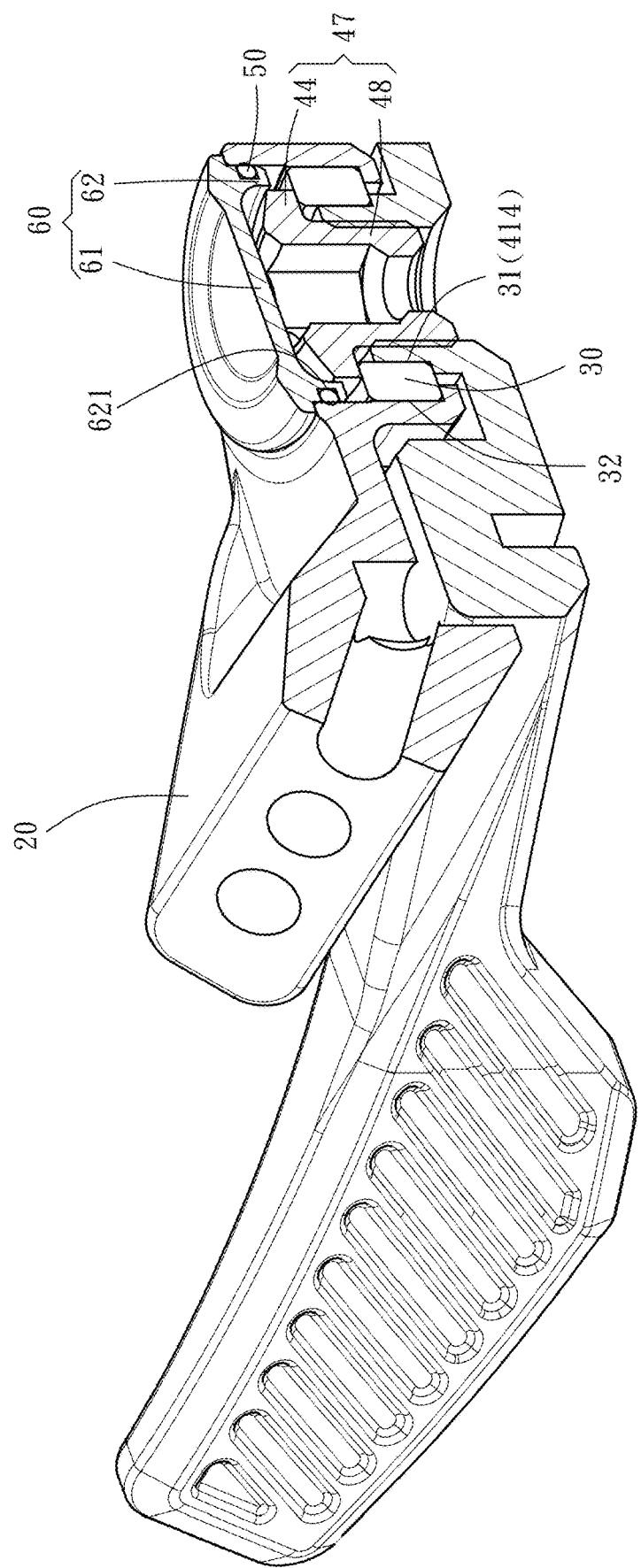
FIG. 15 is a cut-off view taken along line 15-15 of FIG. 13.

The present invention further provides a fourth embodiment. Referring to FIG. 13 to FIG. 15, the wire control device 10‴ of the fourth embodiment is similar in structure to the first embodiment, but one of the differences therebetween is that the wire control device 10‴ of the fourth embodiment further includes a waterproof cap 60. The waterproof cap 60 is disposed on the top end rim of the bearing fixing seat 21. Specifically speaking, the waterproof cap 60 structurally includes a cap portion 61 and a flange portion 62 connected with the cap portion 61. The outer radius of the cap portion 61 is larger than the outer radius of the flange portion 62. The cap portion 61 is located out of the bearing fixing seat 21, and surrounds and covers the top end rim of the bearing fixing seat 21 to prevent water from flowing into the bearing fixing seat 21. The flange portion 62 is inserted into the bearing fixing seat 21. Besides, the flange portion 62 has an annular groove 621. The O-ring 50 is disposed in the annular groove 621. The O-ring 50 is simultaneously abutted against the inner wall of the annular groove 621 and the annular inner wall 212 of the bearing fixing seat 21, that can prevent water from flowing into the bearing fixing seat 21 even better.

In another aspect, in the fourth embodiment, the protrusion 411 of the shift lever 41 has an annular abutted surface 414. The annular abutted surface 414 is configured smoothly and annularly. The protrusion 411 also has a threaded hole H1. The inner race 31 of the bearing 30 is directly sleeved onto and in contact with the annular abutted surface 414. The outer race 32 of the bearing 30 is abutted against the annular inner wall 212 of the bearing fixing seat 21. The head portion 44 of the pivot screw 47 is abutted against the top rim of the inner race 31 of the bearing 30, which means the head portion 44 of the pivot screw 47 is located on a side of the bearing 30 opposite to the shift lever 41. The threaded rod 48 is not in contact with the inner race 31, but screwed into the threaded hole H1 of the protrusion 411. This manner can also attain the effect that the shift lever 41 is unnecessarily configured to be too large, and the main body 20 will not be applied with too large stress by the shift lever 41.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A wire control device, which is disposed on a handlebar, the wire control device comprising:
   a main body comprising a bearing fixing seat, the bearing fixing seat having an annular inner wall;
   a bearing disposed in the bearing fixing seat and comprising an inner race and an outer race, the outer race of the bearing being in contact with the annular inner wall of the bearing fixing seat; and
   a handle assembly rotatably disposed on the main body, the handle assembly having a rotary axle, the inner race of the bearing being sleeved onto and in contact with the rotary axle,
   wherein the inner race of the bearing is in contact with an unthreaded section of the rotary axle.

2. The wire control device as claimed in claim 1, wherein the handle assembly comprises a shift lever and a pivot screw; the shift lever has a threaded hole; the pivot screw comprises a head portion and the rotary axle; the rotary axle further comprises a threaded section; the unthreaded section is connected between the head portion and the threaded section.

3. The wire control device as claimed in claim 2, wherein the wire control device further comprises an O-ring; the O-ring is abutted between the head portion of the pivot screw and a top end rim of the bearing fixing seat.

4. The wire control device as claimed in claim 2, wherein the head portion of the pivot screw has an annular flange; the annular flange is abutted against the inner race of the bearing.

5. The wire control device as claimed in claim 2, wherein the shift lever further has a protrusion; the threaded hole is provided in the protrusion and the protrusion is abutted against the inner race of the bearing.

6. The wire control device as claimed in claim 1, wherein the handle assembly comprises a shift lever and a nut; the rotary axle is connected to the shift lever and further has a threaded section; the unthreaded section is located between the threaded section and the shift lever; the nut is screwed onto the threaded section.

7. The wire control device as claimed in claim 6, wherein the wire control device further comprises an O-ring; the O-ring is abutted between the nut and a top end rim of the bearing fixing seat.

8. The wire control device as claimed in claim 6, wherein the nut has an annular flange; the annular flange is abutted against the inner race of the bearing.

9. The wire control device as claimed in claim 1, wherein the handle assembly comprises a shift lever, a pivot screw and a nut; the shift lever has a threaded hole; the pivot screw comprises a head portion and the rotary axle; the rotary axle further has a first threaded section and a second threaded section; the unthreaded section is located between the first threaded section and the second threaded section; the first threaded section of the pivot screw is connected with the head portion and screwed into the threaded hole of the shift lever; the nut is screwed onto the second threaded section.

10. The wire control device as claimed in claim 9, wherein the wire control device further comprises an O-ring; the O-ring is abutted between the nut and a top end rim of the bearing fixing seat.

11. The wire control device as claimed in claim 9, wherein the nut has an annular flange; the annular flange is abutted against the inner race of the bearing.

12. The wire control device as claimed in claim 1, wherein the wire control device further comprises a waterproof cap; the waterproof cap is disposed on a top end rim of the bearing fixing seat.

13. The wire control device as claimed in claim 12, wherein the waterproof cap comprises a cap portion and a flange portion connected with the cap portion; the cap portion is located out of the bearing fixing seat; the flange portion is inserted into the bearing fixing seat.

14. A wire control device, which is disposed on a handlebar, the wire control device comprising:
   a main body comprising a bearing fixing seat, the bearing fixing seat having an annular inner wall;
   a bearing disposed in the bearing fixing seat and comprising an inner race and an outer race, the outer race of the bearing being in contact with the annular inner wall of the bearing fixing seat;
   a handle assembly rotatably disposed on the main body, the handle assembly comprising a shift lever and a pivot screw, the shift lever having a protrusion, the protrusion having a threaded hole and an annular abutted surface, the inner race of the bearing being sleeved onto and in contact with the annular abutted surface of the protrusion, the pivot screw comprising a head portion and a threaded rod, the head portion being located on a side of the bearing opposite to the shift lever, the threaded rod being screwed into the threaded hole of the shift lever.

15. The wire control device as claimed in claim 14, wherein the wire control device further comprises a waterproof cap; the waterproof cap is disposed on a top end rim of the bearing fixing seat.

16. The wire control device as claimed in claim 15, wherein the waterproof cap comprises a cap portion and a flange portion connected with the cap portion; the cap portion is located out of the bearing fixing seat; the flange portion is inserted into the bearing fixing seat.

17. The wire control device as claimed in claim 16, wherein the wire control device further comprises an O-ring; the flange portion has an annular groove; the O-ring is disposed in the annular groove and abutted against the annular inner wall of the bearing fixing seat.

18. The wire control device as claimed in claim 14, wherein the main body further comprises a clamping annular sleeve; the wire control device is fixed to the handlebar through the clamping annular sleeve.

* * * * *